(12) United States Patent
Hurst, III et al.

(10) Patent No.: US 8,757,720 B2
(45) Date of Patent: Jun. 24, 2014

(54) SEAT TRACK EASY-ENTRY ACTUATION MECHANISM

(75) Inventors: Nelson E. Hurst, III, Westland, MI (US); Prasad D. Jagtap, III, Farmington, MI (US); Jeffrey P. Carroll, West Bloomfield, MI (US); Jonathan A. Calhoun, Linden, MI (US); Rabindranath Persad, Superior Township, MI (US)

(73) Assignee: Magna Seating Inc., Aurora, Ontario (CA)

( * ) Notice: Subject to any disclaimer, the term of this patent is extended or adjusted under 35 U.S.C. 154(b) by 212 days.

(21) Appl. No.: 13/510,013

(22) PCT Filed: Nov. 23, 2010

(86) PCT No.: PCT/CA2010/001878
§ 371 (c)(1),
(2), (4) Date: May 16, 2012

(87) PCT Pub. No.: WO2011/063521
PCT Pub. Date: Jun. 3, 2011

(65) Prior Publication Data
US 2012/0223561 A1    Sep. 6, 2012

Related U.S. Application Data

(60) Provisional application No. 61/264,684, filed on Nov. 26, 2009.

(51) Int. Cl.
*B60N 2/12*    (2006.01)

(52) U.S. Cl.
USPC .......................... 297/341; 297/340; 297/378.1

(58) Field of Classification Search
CPC ......... B60N 2/12; B60N 2/123; B60N 2/2209
USPC ...................................... 297/340, 341, 378.1
See application file for complete search history.

(56) References Cited

U.S. PATENT DOCUMENTS

| 4,607,884 | A |   | 8/1986  | Heling |
|-----------|---|---|---------|--------|
| 4,634,180 | A |   | 1/1987  | Zaveri et al. |
| 5,407,165 | A | * | 4/1995  | Balocke ........................ 248/429 |
| 5,695,247 | A |   | 12/1997 | Premji |
| 6,098,946 | A | * | 8/2000  | Sechet et al. ................... 248/424 |

(Continued)

FOREIGN PATENT DOCUMENTS

| CA | 1292936 | 12/1991 |
|----|---------|---------|
| FR | 2851209 | 8/2004  |

*Primary Examiner* — Philip Gabler
(74) *Attorney, Agent, or Firm* — Miller Canfield

(57) ABSTRACT

A seat track assembly includes a seat track operable for sliding movement of a seat assembly. A towel bar pivots a drive lever unlocking the seat track and allowing sliding movement of the seat assembly within a range of comfort positions. A stop lever pivots between a lowered position and a raised position. In the lowered position, the stop lever engages a stop bracket secured to the seat track preventing the seat assembly from moving forward of the range of comfort positions. A cam pivots in response to pivotally moving a seat back to a dump position. Pivoting the cam pivots the drive lever unlocking the seat track and pivots the stop lever to the raised position spaced above the stop bracket to allow sliding movement of the seat assembly to an easy-entry position forward of the range of comfort positions.

10 Claims, 5 Drawing Sheets

(56) References Cited

U.S. PATENT DOCUMENTS

| | | |
|---|---|---|
| 6,439,531 B1 | 8/2002 | Severini et al. |
| 6,443,414 B1 | 9/2002 | Horsfield et al. |
| 6,616,233 B1 | 9/2003 | Debus et al. |
| 6,767,063 B1 * | 7/2004 | Abdella et al. ........... 297/378.12 |
| 7,025,419 B2 * | 4/2006 | Sasaki et al. ............. 297/344.11 |
| 7,434,883 B2 | 10/2008 | Deptolla |
| 7,971,920 B2 * | 7/2011 | Jang et al. .................. 296/65.13 |
| 2003/0122412 A1 | 7/2003 | Niimi et al. |
| 2004/0051361 A1 * | 3/2004 | Rausch et al. ................ 297/341 |
| 2004/0113473 A1 | 6/2004 | Kojima |
| 2008/0143160 A1 | 6/2008 | Schmale |
| 2009/0200849 A1 * | 8/2009 | Schmale ....................... 297/341 |
| 2009/0243359 A1 | 10/2009 | Yoshida et al. |

* cited by examiner

SEAT TRACK EASY-ENTRY ACTUATION MECHANISM

BACKGROUND OF THE INVENTION

1. Field of the Invention

The invention relates to a seat track assembly for a motor vehicle seat. More particularly, the invention relates to a seat track assembly for selectively adjusting a seat assembly within a range of comfort positions and moving the seat assembly to an easy-entry position forward of the range of comfort positions in response to pivoting a seat back to a dump position.

2. Description of Related Art

Automotive vehicles include seat assemblies for supporting occupants within the vehicle. A typical seat assembly includes a seat cushion and a seat back operatively coupled to the seat cushion by a recliner mechanism allowing selective pivotal adjustment of the seat back relative to the seat cushion between a plurality of rearwardly reclined seating positions. The seat back is also often pivotally movable to a forwardly inclined dump position to allow ingress and egress to a rear seat assembly or storage area located behind the seat assembly.

It is known in the automotive seating art to provide a seat track assembly that slidably interconnects the seat assembly to a floor of the vehicle. The seat track assembly provides forward and rearward movement of the seat assembly along the floor to allow an occupant to select a particular fore/aft seating position within a range of comfort positions. The seat track assembly typically includes a lower or fixed track mounted to the floor of the vehicle and an upper or movable track slidably engaging the fixed track and mounted to a bottom surface of the seat cushion. A locking mechanism is operatively coupled between the fixed and movable tracks and selectively locks the movable track relative to the fixed track.

It is also known to operatively couple the seat back and the locking mechanism such that when the seat back is pivoted to the dump position, the seat track assembly is unlocked allowing the seat assembly to move forward to an easy-entry position. With the seat back in the dump position and the seat assembly in the easy-entry position, ingress and egress to the rear seat assembly or storage area is made even easier.

It is desirable to provide an improved seat track assembly for selectively adjusting a seat assembly between a plurality of fore/aft seating positions within a range of comfort positions. It is also desirable to provide an improved seat track assembly for moving the seat assembly to an easy-entry position forward of the range of comfort positions in response to pivoting a seat back to a dump position.

SUMMARY OF THE INVENTION

According to one aspect of the invention, a seat track assembly includes a seat track operable for sliding movement of a seat assembly between a range of comfort positions and an easy-entry position. The range of comfort positions includes a forward comfort position and the easy-entry position is disposed forward of the forward comfort position. A towel bar is pivotally coupled at a first pivot to the seat track. A drive lever is pivotally coupled to the seat track at the first pivot and is coupled directly with the towel bar for pivotal movement therewith. The drive lever unlocks the seat track and allows sliding movement of the seat assembly within the range of comfort positions in response to actuating the towel bar. A stop bracket is fixedly secured to the seat track. A stop lever is pivotally coupled to the seat track at the first pivot and pivots between a lowered position that engages with the stop bracket when the seat assembly is in the forward comfort position and a raised position allowing sliding movement of the seat assembly to the easy-entry position. A cam is pivotally coupled to the seat track at a second pivot and is coupled directly with the stop lever. The cam engages the drive lever and unlocks the seat track and pivots the stop lever to the raised position allowing sliding movement of the seat assembly to the easy-entry position in response to pivotal movement of the seat back to the dump position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
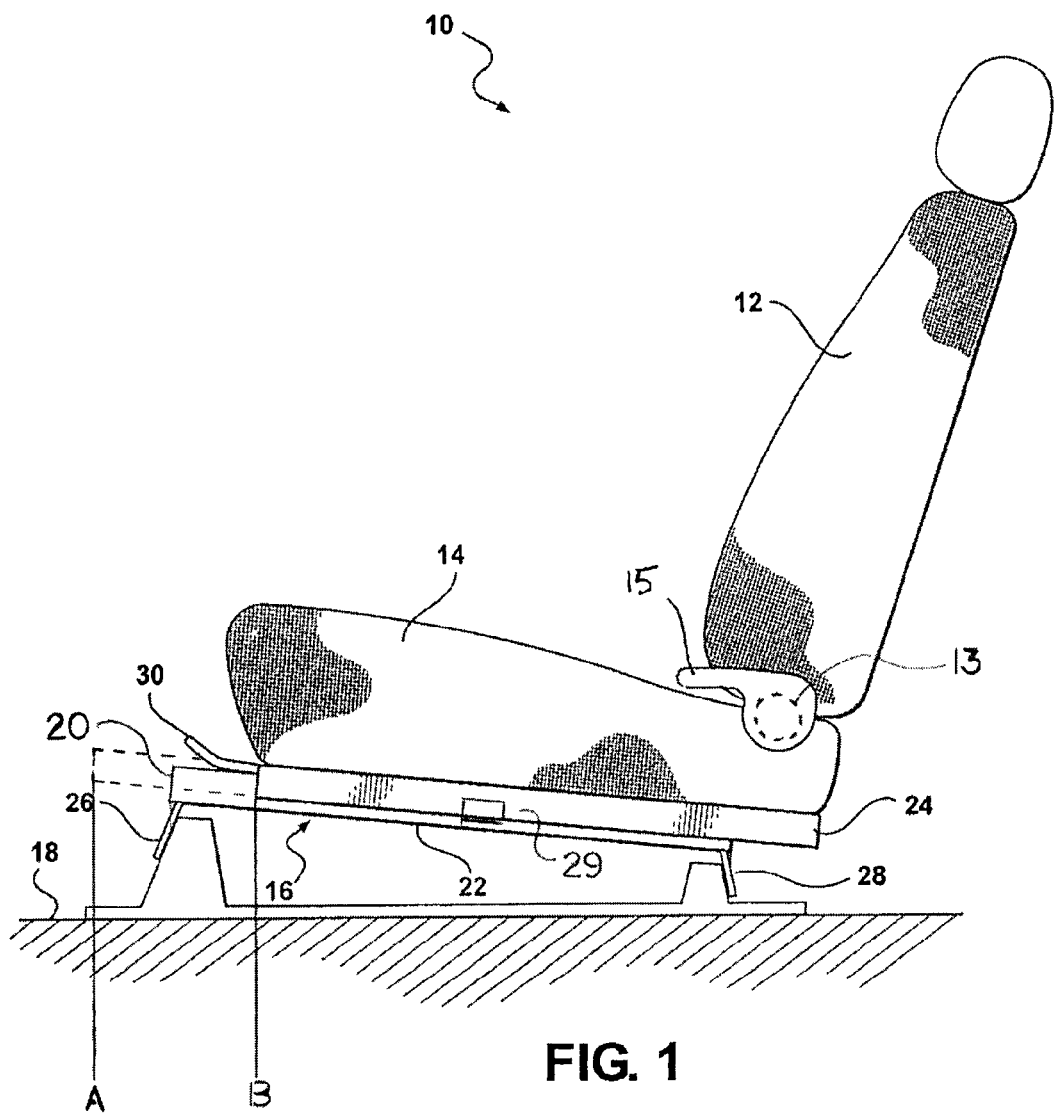
FIG. 1 is a side view of a seat assembly including a seat back in an upright seating position and a seat track assembly according to one embodiment of the invention.
Figure 2:
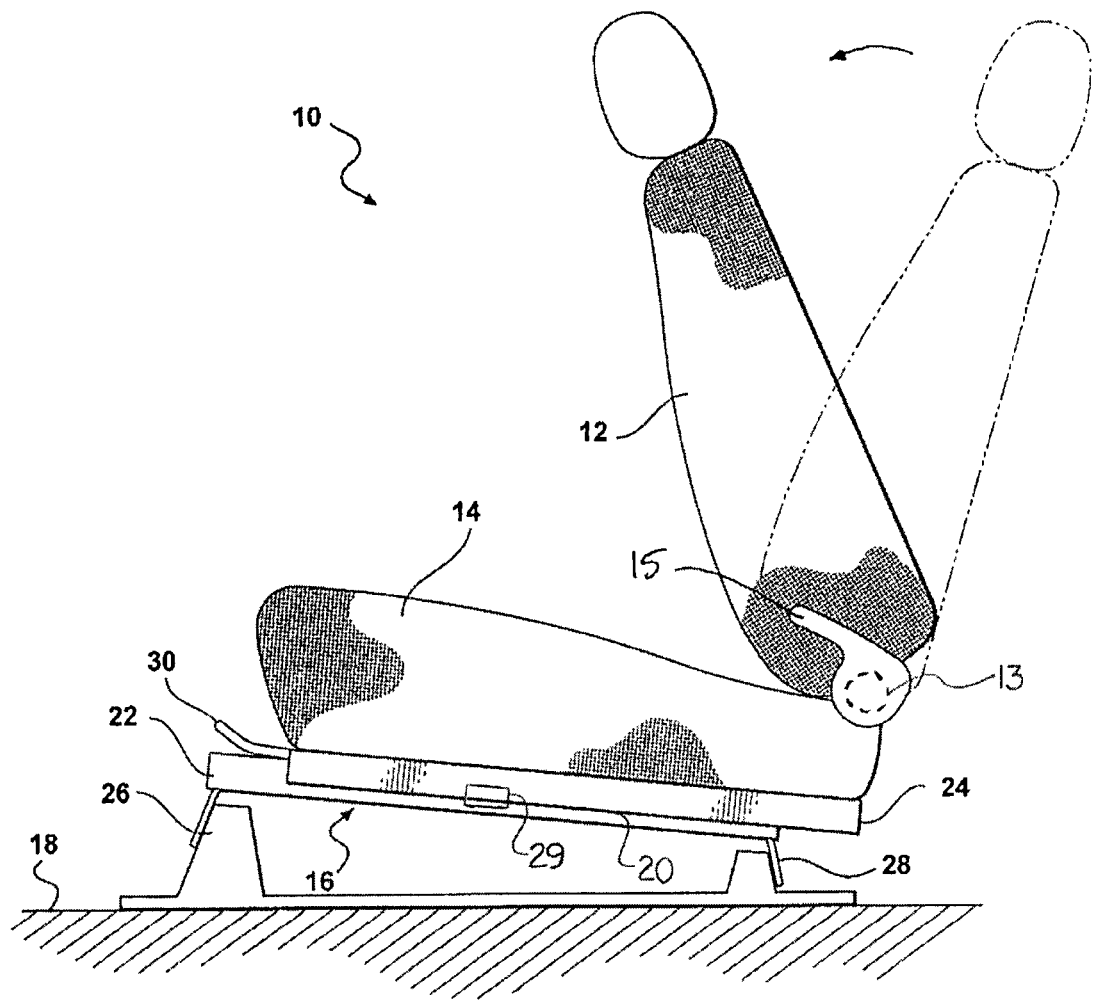
FIG. 2 is a side view of the seat assembly with the seat back in a dump position.

Referring to the Figures, a seat assembly for use in an automotive vehicle is generally shown at 10. The seat assembly 10 includes a seat back 12 operatively coupled to a seat cushion 14 by a recliner mechanism 13 allowing selective pivotal movement of the seat back 12 relative to the seat cushion 14 between a plurality of rearwardly reclined seating positions and a forwardly inclined dump position. The seat back 12 is normally biased toward the dump position, shown in FIG. 2. In FIG. 1, the seat back 12 is shown in one of the plurality of rearwardly reclined seating positions. The recliner mechanism 13 is selectively unlocked to adjust the seat back 12 between the plurality of rearwardly reclined seating positions by actuating a recliner handle 15. As is well known in the vehicle seating art, a seat track assembly, generally shown at 16, is provided for slidably interconnecting the seat assembly 10 to a floor 18 of the vehicle. The seat track assembly 16 allows selective fore and aft adjustment of the seat assembly 10 in a longitudinal direction along the vehicle floor 18. The seat track assembly 16 includes a pair of laterally spaced apart seat tracks 20, however, only one is shown in the Figures. It is appreciated that the pair of seat tracks are substantially the same.

Figure 4:
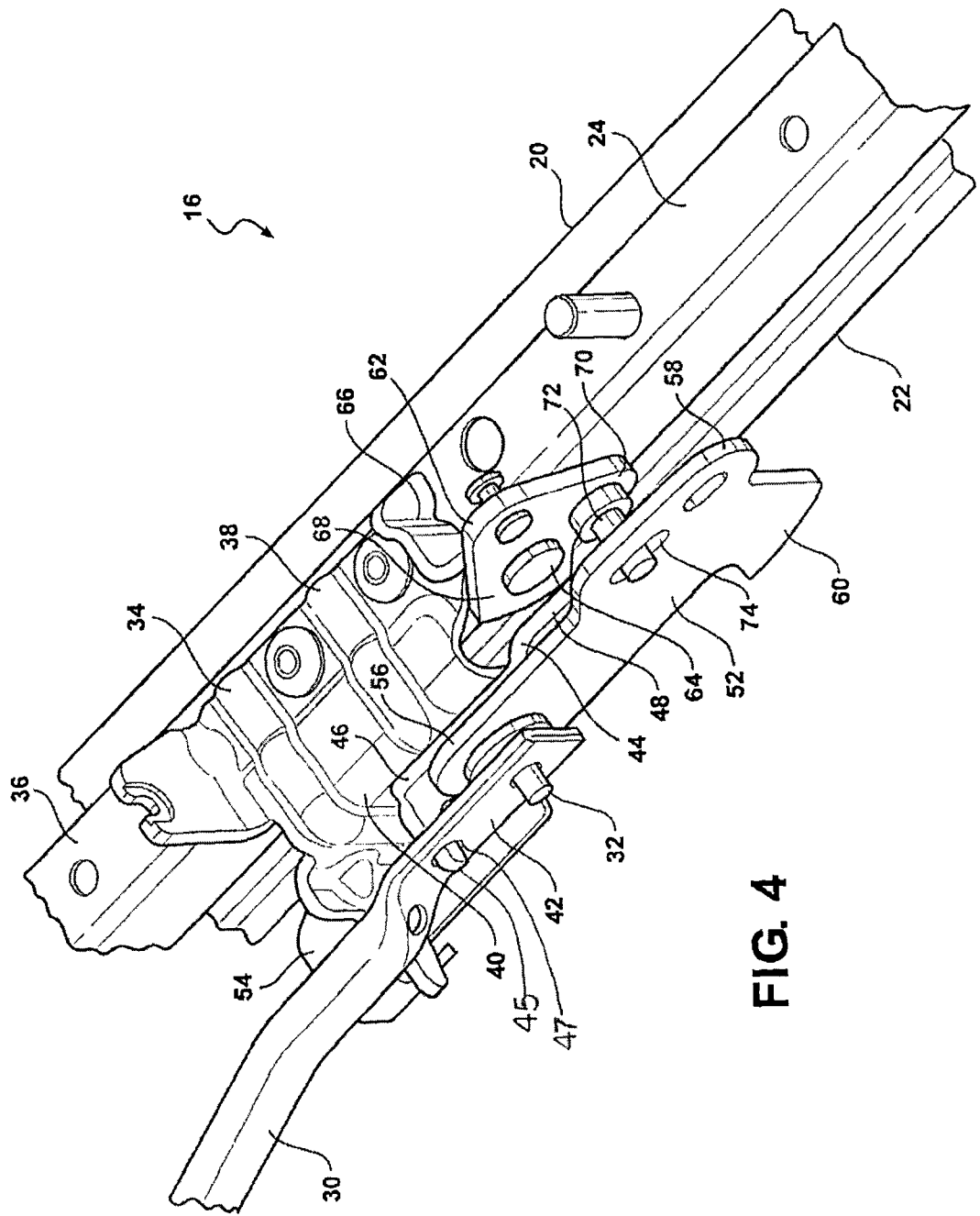
FIG. 4 is a fragmentary, perspective view of the seat track assembly.

Referring also to FIG. 4, the seat track 20 includes a lower fixed track 22 and an upper movable track 24. In the embodiment shown, the fixed track 22 is mounted to the vehicle floor 18 by front and rear risers 26, 28. The movable track 24 is adapted to be fixedly secured to an underside of the seat cushion 14 and is slidably coupled to the fixed track 22 for longitudinal sliding movement relative thereto. Thus, when the movable track 24 slides relative to the fixed track 22, the seat assembly 10 moves fore and aft in the longitudinal direction.

The seat track 20 includes a latch mechanism 29 for locking the movable track 24 relative to the fixed track 22 thereby locking the seat assembly 10 in one of a plurality of fore/aft positions within a range of comfort positions, as is commonly known to one skilled in the art. The range of comfort positions of the seat assembly 10 is defined between a forward comfort position, shown at A in FIG. 1, and a rearward comfort position, shown at B in FIG. 1. The latch mechanism 29 is operable between a locked condition preventing sliding movement of the movable track 24 relative to the fixed track 22 and an unlocked condition allowing sliding movement of the movable track 24 relative to the fixed track 22. The latch mechanism 29 is biased toward the locked condition such that the movable track 24 is normally secured relative to the fixed track 22. The latch mechanism 29 is actuated from the locked condition to the unlocked condition by lifting a towel bar 30. The towel bar 30 extends forwardly from underneath the seat cushion 14, as is well known in the art.

Figure 5:
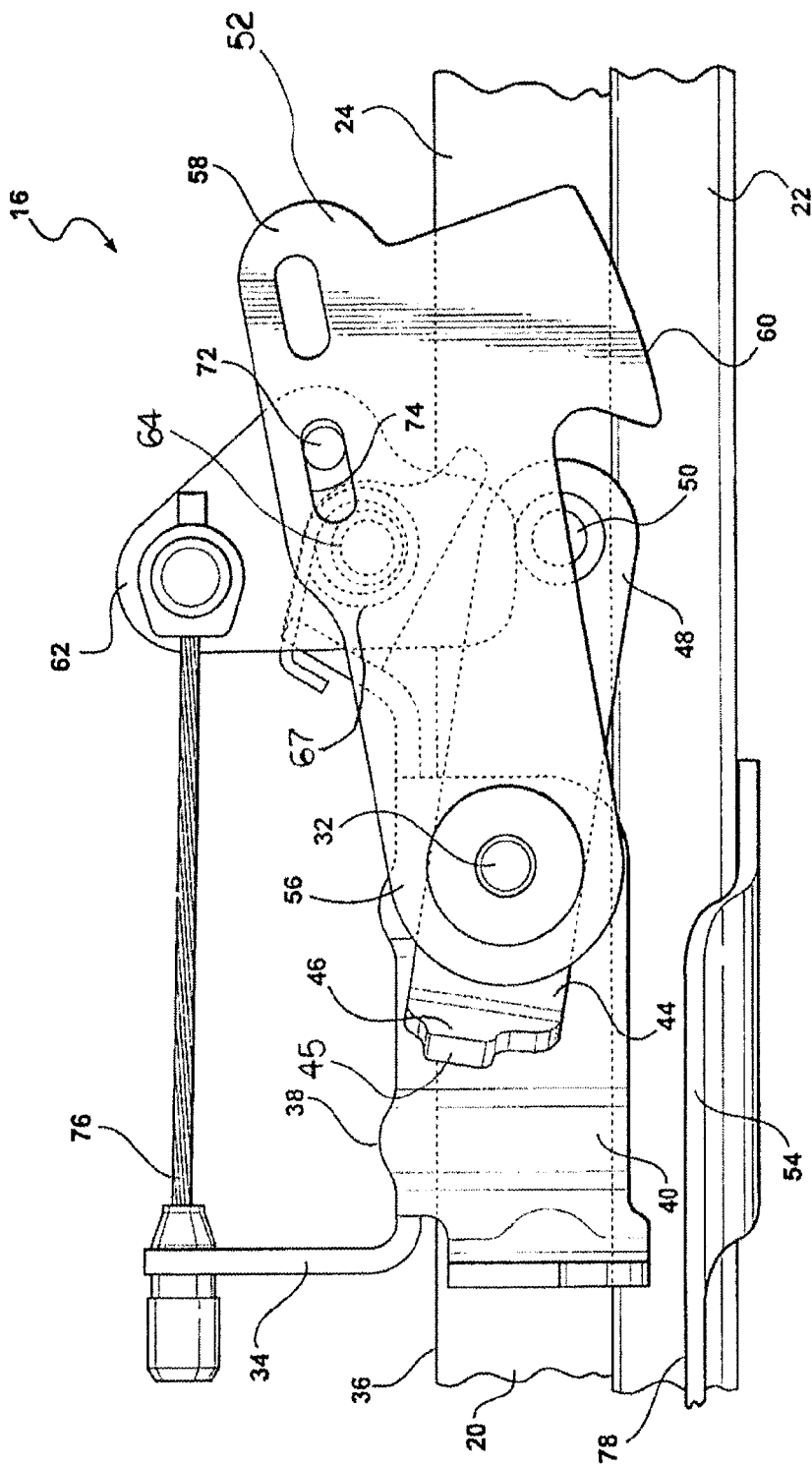
FIG. 5 is a fragmentary, side view of the seat track assembly.

Referring to FIGS. 4 and 5, the towel bar 30 is pivotally coupled at pivot 32 to a mounting bracket 34 that is fixedly secured to an upper surface 36 of the movable track 24. The mounting bracket 34 is configured to include a horizontal portion 38 fixedly secured to the upper surface 36 of the movable track 24 and a vertical portion 40 extending downwardly from the horizontal portion 38 adjacent to an inner side of the seat track 20. A distal end 42 of the towel bar 30 is pivotally coupled at pivot 32 to the vertical portion 40 of the mounting bracket 34. A drive lever 44 is disposed laterally between the distal end 42 of the towel bar 30 and the vertical portion 40 of the mounting bracket 34 and is also pivotally coupled at pivot 32. The drive lever 44 extends between a first end 46 and a second end 48. The drive lever 44 is pivotally coupled at pivot 32 between the first and second ends 46, 48. The first end 46 of the drive lever 44 is coupled with the towel bar 30 such that the drive lever 44 pivots therewith. That is, the drive lever 44 includes a outwardly projecting tab portion 45 extending through a mating slot 47 in the towel bar 20 to intercouple the drive lever 44 and towel bar 30. The second end 48 of the drive lever 44 is coupled with a shaft 50 of the latch mechanism 29, a portion of which is shown in FIG. 5, extending from within the seat track 20. Lifting the towel bar 30 pivots the drive lever 44 about pivot 32 in a first direction (clockwise when viewed from FIG. 4) and pushes the shaft 50 downward, which urges the latch mechanism 29 from the locked condition to the unlocked condition. As stated above, with the latch mechanism 29 in the unlocked condition the movable track 24 is slidably movable relative to the fixed track 22 and the seat assembly 10 can be positioned in any one of the plurality of fore/aft positions between the forward comfort position A and the rearward comfort position B.

In normal operation, adjusting the longitudinal position of the seat assembly 10 by lifting the towel bar 30 does not allow the seat assembly 10 to slide forward beyond the forward comfort position A because a stop lever 52 engages a stop bracket 54. The stop lever 52 is disposed laterally between the distal end 42 of the towel bar 30 and the drive lever 44 and is also pivotally coupled at pivot 32. The stop lever 52 extends between a first end 56 and a second end 58. The first end 56 of the stop lever 52 is pivotally coupled at pivot 32. The second end 58 of the stop lever 52 includes a downwardly projecting hook 60 adapted for engaging the stop bracket 54. The stop bracket 54 is fixedly secured to the fixed track 22. The second end 58 of the stop lever 52 pivots between a lowered position, shown in FIG. 4, and a raised position, shown in FIG. 5. When the second end 58 of the stop lever 52 is in the lowered position and the seat assembly 10 is slid forward the hook 60 engages the stop bracket 54 and stops the seat assembly 10 in the forward comfort position A.

Figure 3:
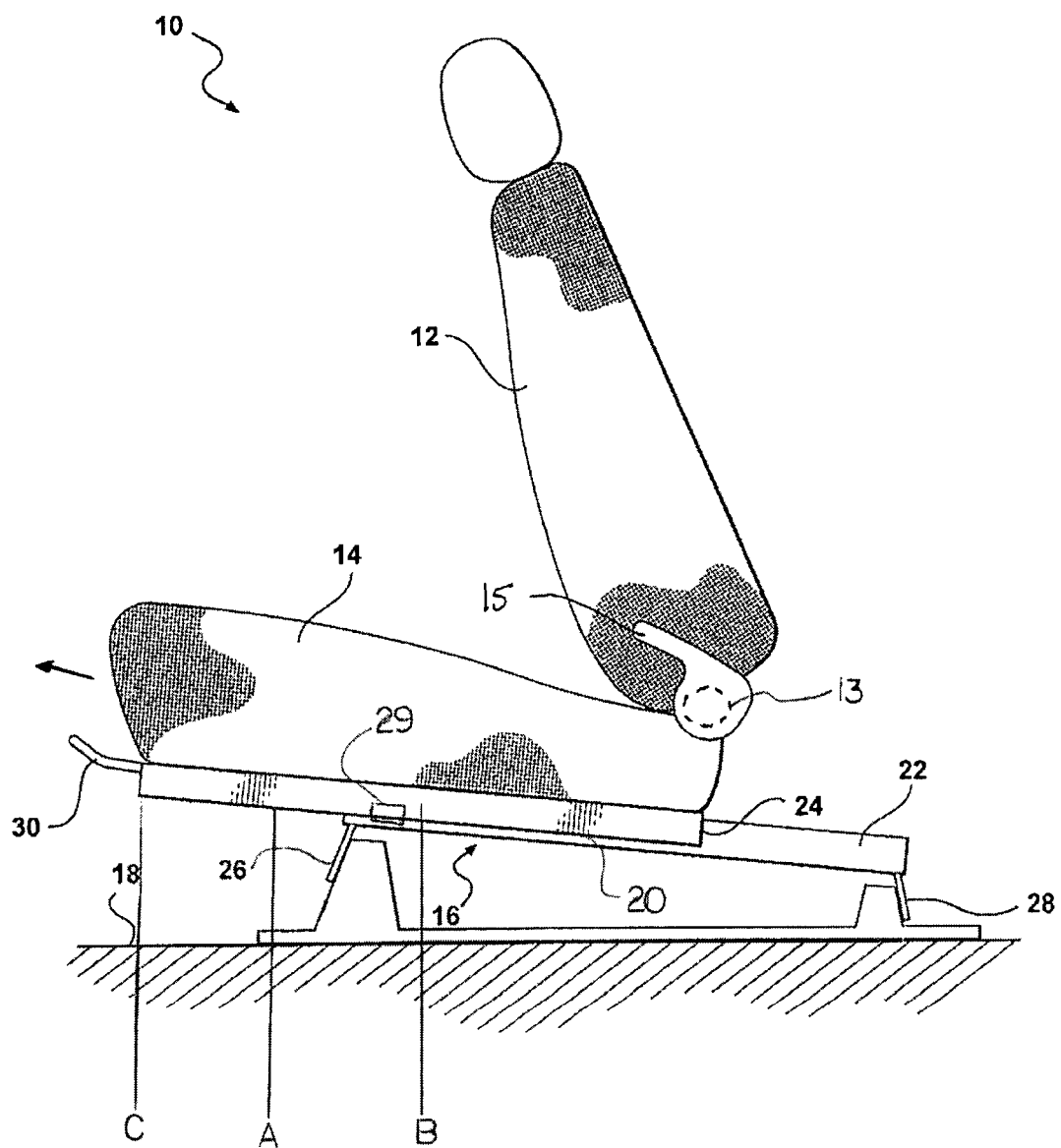
FIG. 3 is a side view of the seat assembly with the seat back in the dump position and the seat assembly in an easy-entry position.

The seat track 20 also includes a cam 62 for actuating the latch mechanism from the locked condition to the unlocked condition and simultaneously lifting the second end 58 of the stop lever 52 to the raised position to prevent the hook 60 from engaging the stop bracket 54 such that the seat assembly 10 is free to slide forward beyond the forward comfort position A to an easy-entry position C, shown in FIG. 3. The cam 62 is pivotally coupled at pivot 64 to a tab 66 extending from the horizontal portion 38 of the mounting bracket 34 and is biased in a first direction (clockwise in FIG. 4) by a torsion spring 67. The cam 62 includes a first cam end 68 and a second cam end 70. The first cam end 68 is adapted for engaging the second end 48 of the drive lever 44 to actuate the latch mechanism 29 from the locked condition to the unlocked condition. The second cam end 70 includes a pin 72 that extends laterally into an enclosed slot 74 in the second end 58 of the stop lever 52, thereby coupling the cam 62 and the stop lever 52. In response to pivoting the cam 62 in a second direction (counterclockwise in FIG. 4) to a pivoted position, the first cam end 68 engages the second end 48 of the drive lever 44 and pivots the drive lever 44 in the first direction about pivot 32 thereby pushing the shaft 50 downward, which urges the latch mechanism 29 from the locked condition to the unlocked condition. Simultaneously, the second cam end 70 lifts the second end 58 of the stop lever 52 to the raised position due to the coupling of the cam 62 and the stop lever 52 through the pin 72. When the second end 58 of the stop lever 52 is in the raised position and the seat assembly 10 is slid forward the hook 60 passes over the stop bracket 54 and allows the seat assembly 10 to move to the easy-entry position C. It is appreciated that the seat track assembly 16 may include a spring to bias the seat assembly 10 to the easy-entry position C.

A Bowden-type cable 76 is operatively coupled between the seat back 12 and the cam 62. The cable 76 pivots the cam 62 in the second direction in response to pivoting the seat back 12 from one of the rearwardly reclined seating positions to the dump position.

Thus, pivoting the seat back 12 to the dump position urges the latch mechanism 29 from the locked condition to the unlocked condition and simultaneously lifts the second end 58 of the stop lever 52 to the raised position, allowing the seat assembly 10 to slide forward to the easy-entry position C. Ingress and egress to a rear seat assembly or storage area is increased when the seat back 12 is in the dump position and the seat assembly 10 is in the easy-entry position C.

To return the assembly 10 to a seating position a user pushes rearwardly on the seat back 12, which slides the seat assembly 10 rearward toward the range of comfort positions. The bias of the seat back 12 toward the dump position is greater than the bias of the seat assembly 10 toward the easy-entry position such that the seat back 12 remains in the dump position as the seat assembly 10 slides rearward toward the range of comfort positions. With the seat back 12 in the dump position the cable 76 maintains the cam 62 in the pivoted position such that the latch mechanism 29 remains in the unlocked condition and the second end 58 of the stop lever 52 remains in the raised position. Once the seat assembly 10 reaches the rearward comfort position B the movable track 24 stops sliding relative to the fixed track 22. The user pushing rearwardly on the seat back 12 now overcomes the bias of the seat back 12 thereby pivoting the seat back 12 from the dump position to one of the rearwardly reclined seating positions. Pivoting the seat back 12 to one of the rearwardly reclined seating positions releases the cable 76 and the bias of the torsion spring 67 pivots the cam 62 in the first direction. As the cam 62 pivots in the first direction, the latch mechanism 29 returns to the locked condition and the second end 58 of the stop lever 52 returns to the lowered position. The seat assembly 10 can now be adjusted using the towel bar 30 to any one of the fore/aft positions within the range of comfort positions.

Alternatively, the cable 76 may be prematurely released if the bias of the seat back 12 toward the dump position is deliberately overcome by forcing the seat back 12 to pivot from the dump position to one of the rearwardly reclined seating positions prior to sliding the seat assembly 10 from the easy-entry position C. In this instance, the latch mechanism 29 will not, however, return to the locked condition because the hook 60 is disposed above an upper horizontal surface 78 of the stop bracket 54. Thus, the hook 60 engages the upper horizontal surface 78 of the stop bracket 54, which prevents the second end 58 of the stop lever 52 from returning to the lowered position. Since the second end 58 of the stop lever 52 cannot return to the lowered position, the cam 62 remains in the pivoted position, which in turn maintains the latch mechanism 29 in the unlocked condition. The hook 60 rides along the upper horizontal surface 78 of the stop bracket 54 as the seat assembly 10 slides rearward toward the range of comfort positions. Once the seat assembly 10 reaches the forward comfort position A the hook 60 drops off the upper horizontal surface 78 of the stop bracket 54 and the second end 58 of the stop lever 52 returns to the lowered position. As the second end 58 of the stop lever 52 returns to the lowered position, the cam 62 pivots in the first direction allowing the latch mechanism 29 to return to the locked condition. The seat assembly 10 can now be adjusted using the towel bar 30 to any one of the fore/aft positions within the range of comfort positions.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat track assembly for a seat assembly having a seat back pivotal between a generally upright seating position and a forward dump position, said seat track assembly comprising:
   a seat track operable for sliding movement of the seat assembly between a range of comfort positions and an easy-entry position, said range of comfort positions including a forward comfort position and said easy-entry position disposed forward of said forward comfort position;
   a towel bar pivotally coupled at a first pivot to said seat track;
   a drive lever pivotally coupled to said seat track at said first pivot and coupled directly with said towel bar for pivotal movement therewith, said drive lever unlocking said seat track and allowing sliding movement of the seat assembly within said range of comfort positions in response to actuating said towel bar;
   a stop bracket fixedly secured to said seat track;
   a stop lever pivotally coupled to said seat track at said first pivot, said stop lever pivotal between a lowered position engageable with said stop bracket in said forward comfort position and a raised position allowing sliding movement of the seat assembly to said easy-entry position; and
   a cam rotatably coupled to said seat track at a second pivot and coupled directly with said stop lever, said cam engaging said drive lever to unlock said seat track and pivoting said stop lever to said raised position allowing sliding movement of the seat assembly to said easy-entry position in response to pivotal movement of the seat back to the dump position.

2. A seat track assembly as set forth in claim 1 wherein said cam includes a first cam end for selectively engaging said drive lever to pivot said drive lever and unlock said seat track and a second cam end opposite said first cam end operatively coupled to said stop lever for pivoting said stop lever to said raised position spaced above said stop bracket to allow sliding movement of the seat assembly to said easy-entry position.

3. A seat track assembly as set forth in claim 2 wherein said seat track includes a lower fixed track adapted to fixedly secure the seat assembly to a floor of an automotive vehicle and an upper movable track slidably coupled to said lower fixed track and fixedly secured to the seat assembly for providing fore and aft sliding movement of the seat assembly between said range of comfort positions and said easy-entry position.

4. A seat track assembly as set forth in claim 3 further including a latch mechanism operatively coupled between said upper movable track and said lower fixed track for selective operation between a locked condition preventing sliding movement of said upper movable track relative to said lower fixed track and an unlocked condition allowing sliding movement of said upper movable track relative to said lower fixed track.

5. A seat track assembly as set forth in claim 4 wherein said drive lever includes a first end directly coupled to said towel bar and an opposite second end operatively coupled with said latch mechanism for actuating said latch mechanism between said locked and unlocked conditions in response to pivotal movement of said towel bar.

6. A seat track assembly as set forth in claim 5 wherein said stop lever includes a first end pivotally coupled by said first pivot to said upper movable track and an opposite second end defining a hook portion for engagement with said stop bracket to prevent sliding movement of the seat assembly to said easy-entry position.

7. A seat track assembly as set forth in claim 6 wherein said cam includes a torsion spring coupled between said cam and said upper movable track for biasing said cam in a first direction disengaged from said drive lever.

8. A seat track assembly as set forth in claim 7 wherein said cam include a pin projecting from said second cam end received in a slot formed in the second end of the stop lever for actuating said stop lever between said lowered position for engagement with said stop bracket and said raised position spaced above said stop bracket in response to rotation of said cam.

9. A seat track assembly as set forth in claim 8 further including a cable having a first end adapted to be coupled to the seat back and a second end coupled to said cam for rotating said cam in response to pivotal movement of the seat back to the dump position thereby actuating said latch mechanism to said unlocked condition and said stop lever to said raised position to allow sliding movement of the seat assembly to said easy-entry position.

10. A seat assembly for use in an automotive vehicle, said seat assembly comprising:
    a seat cushion adapted to be mounted to a floor of the automotive vehicle;

a seat back pivotally coupled to said seat cushion for pivotal movement between a generally upright seating position and a forward dump position at least partially overlying said seat cushion;

a seat track operatively connected to said seat cushion for providing selective fore and aft sliding movement of said seat assembly between a range of comfort positions and an easy-entry position, said range of comfort positions including a forward comfort position and a rearward comfort position, and said easy-entry position disposed forward of said forward comfort position;

a latch mechanism operatively coupled to said seat track for movement between a locked condition preventing sliding movement of said seat assembly and an unlocked condition allowing sliding movement of said seat assembly;

a towel bar pivotally coupled at a first pivot to said seat track and operatively coupled to said latch mechanism for actuating said latch mechanism between said locked and unlocked conditions;

a drive lever pivotally coupled to said seat track at said first pivot and coupled to said towel bar for pivotal movement therewith for actuating said latch mechanism to said unlocked condition allowing sliding movement of said seat assembly within said range of comfort positions in response to pivotal actuation of said towel bar;

a stop bracket fixedly secured to said seat track;

a stop lever having a first end pivotally coupled to said seat track at said first pivot and an opposite second end, said stop lever pivotal between a lowered position wherein said second end engages said stop bracket in said forward comfort position and a raised position wherein said second end is spaced above said stop bracket to allow sliding movement of said seat assembly to said easy-entry position; and a cam pivotally coupled to said seat track at a second pivot and operatively coupled to said stop lever, said cam including a first cam end for engaging said drive lever for actuating said latch mechanism from said locked condition to said unlocked condition and a second cam end for pivoting said stop lever from said lowered position to said raised position allowing sliding movement of said seat assembly to said easy-entry position in response to pivotal movement of said seat back to said dump position.

* * * * *